United States Patent [19]

Tuzson

[11] 4,040,773
[45] Aug. 9, 1977

[54] OIL-WATER INTERFACE CONTROL FOR SUBMERSIBLE ELECTRIC MOTOR

[75] Inventor: John J. Tuzson, Evanston, Ill.

[73] Assignee: Borg-Warner Corporation, Chicago, Ill.

[21] Appl. No.: 634,793

[22] Filed: Nov. 24, 1975

[51] Int. Cl.² ............................................. F04B 17/00
[52] U.S. Cl. ....................................... 417/424; 92/83; 310/87
[58] Field of Search ...................... 417/9, 13, 53, 368, 417/424; 92/83; 415/111; 310/87, 88; 277/28, 35, 56

[56] References Cited

U.S. PATENT DOCUMENTS

| 1,027,947 | 5/1912 | Wedge | 92/83 |
| 2,002,914 | 5/1935 | Mendenhall et al. | 415/111 X |
| 2,002,916 | 5/1935 | Mendenhall et al. | 310/87 |
| 2,233,672 | 3/1941 | Mason | 310/87 |
| 2,577,559 | 12/1951 | Armstrong et al. | 417/13 |
| 2,781,209 | 2/1957 | Jacobs | 415/111 X |

Primary Examiner—William L. Freeh
Assistant Examiner—Edward Look
Attorney, Agent, or Firm—Aubrey L. Burgess

[57] ABSTRACT

Submersible electric motors, i.e., those which operate in water or brine wells, are protected against the entry of the well liquid which may contain foreign matter by being submersed in a neutral liquid, such as refined oil. Apparatus is provided which includes a float to sense the interface between the oil inside the electric motor and the well fluid outside the motor, which float and a cooperating valve and an auxiliary oil pump provides a regulated flow of oil to maintain the interface of the oil and well fluid at a fixed location. The intrusion of motor damaging well fluid into the motor is prevented.

2 Claims, 2 Drawing Figures

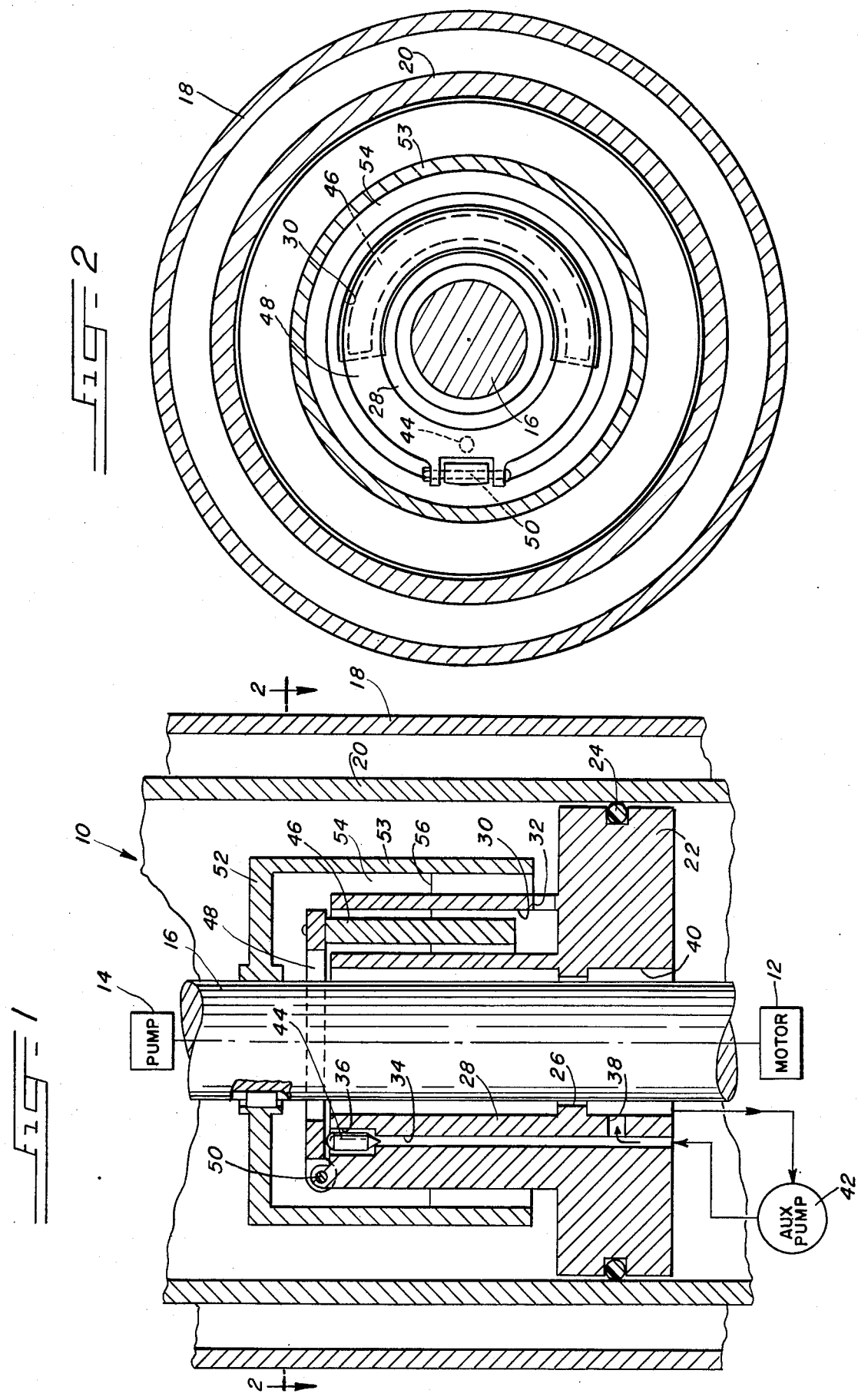

OIL-WATER INTERFACE CONTROL FOR SUBMERSIBLE ELECTRIC MOTOR

BACKGROUND OF THE INVENTION

Submersible pumps are widely used for pumping water, brine, and the like from deep wells. Generally, these pumps include motor and seal section units filled with a fluid which serves as a coolant and a lubricant for the moving parts of the motor. The seal section is usually disposed between the pump and the motor along the operating shaft and includes at least one rotary seal which prevents ingress of well fluid, i.e., water, brine, and the like and foreign matter therein, along the shaft. In addition, the seal section serves as a reservoir for the lubricating and cooling fluid and accommodates expansion and contraction of the fluid during on-and-off cycling of the motor. Necessarily, the fluid in the seal section is in communication with the well environment to accommodate fluid expansion and therefore means must be provided to effectively block ingress of well fluid which would damage motor parts and ultimately result in premature breakdown.

A problem long associated with the design of submersible motors and seal sections has been that of effectively blocking ingress of ambient well fluid. The difficulty of separation of motor and well fluid was complicated by the miscibility of well fluid with known lubricating and cooling fluids. Also, solutions that effectively blocked ingress of well fluid were poor lubricants or ineffective coolants.

Recent developments have included utilization of an intermediate fluid interposed between the lubricating and cooling fluid and the ambient well fluid in the seal section. The intermediate fluid is insoluble in, and usually heavier than, both the lubricating and cooling fluid and the well fluid. Well fluid drawn into the seal section is separated from the lubricating and cooling fluid by the intermediate fluid. As a result, contamination of the motor is prevented.

Use of an intermediate fluid such as that described necessitates complicated seal section construction, to insure effective blockage of ambient well fluid over prolonged periods. In addition, critical assembly procedures and careful handling of the seal section are required to establish and maintain the proper relationship between the blocking fluid and the lubricating and cooling fluid.

An improved form of submersible motor and seal section uses a single fluid to provide effective lubrication and cooling of the motor, while simultaneously providing an effective barrier to ingress of ambient well fluid.

THE INVENTION

According to this invention, the well fluid, i.e., water brine, and the like, interface is located in an inverted cup, which is connected to a rotating shaft such that the cup rotates with the shaft and relative to the well motor casings. It is important that the rotating, inverted cup forms the outer wall of the cavity which contains the interface rather than the inner wall thereof because the least amount of mixing of the fluids will occur near the interface under this condition, which thus insures a stable interface with the lighter fluid, i.e., oil, on top of the heavier fluid, i.e., well fluid. A float means is located in an adjacent chamber which communicates with both fluids. The adjacent chamber is stationary with respect to the well and motor casings to minimize the disturbing effect of rotation on the float means. The float means includes a hinged float which moves up and down with the motion of the interface and it actuates a plunger valve to permit the passage of oil to the body of oil. An auxilliary oil pump pumps the oil from a reservoir to a location or locations to stabilize the position of the interface. Because the interface zone is at a higher pressure than that in the motor case, there is an oil flow from the interface zone along the rotating shaft to the motor case. This backflow is controlled by providing a close clearance or a mechanical seal between the shaft and a portion of the motor casing. A by-pass orifice near the oil pump outlet permits oil to by-pass the plunger valve when the plunger valve is closed; this being necessary because the auxilliary pump continuously operates.

THE DRAWING

FIG. 1 is a sectional view of the mechanism of this invention with some parts shown schematically; and FIG. 2 is a view taken on line 2—2 of FIG. 1 looking in the direction of the arrows.

DETAILED DESCRIPTION

Looking at the drawing, there is illustrated a seal section 10 for a submersible pump motor 12 which drives a pump 14 by means of a connecting shaft means 16. The shaft 16 may be constructed of multiple parts suitably joined together, as is common in the art. The assembly of pump, motor and seal section is adapted to be lowered into a well casing 18 and is enclosed in a generally cylindrical jacket or casing 20.

An annular separating member 22 is positioned between the motor 12 and the pump 14 and is sealed to the casing 20 by an 0-ring seal 24. The shaft 16 passes centrally through the member 22 which is constructed at 26 to be in close proximity to the shaft 16 or to incorporate a centrally located mechanical seal, for a purpose to be later explained.

The member 22 has an upwardly extending cylindrical portion 28 spaced a greater distance from the shaft 16 than that portion identified as 26. The cylindrical portion 28 is machined or otherwise formed to provide a float receiving cavity 30 and a passage 32 communicating the cavity 30 with the exterior of the portion 28. Also, the portion 28 and the member 22 are drilled at 34 and counter-bored at 36 to provide a passageway therethrough from the top to the bottom thereof. A by-pass passage 38 connects the passage 34 with the central opening 40 of the member 22, which central opening is of larger diameter than the part 26.

An auxiliary pump 42 has its outlet connected to the passageway 34, and a float valve 44 is received in the counterbore 36.

A float 46 is received in the cavity 30; it is supported by an arm 48 pivoted at 50 on trunions supported by the portion 26.

An inverted cup-shaped member 52 is attached to the shaft 16 and has its side portion 53 depending toward the member 22 and spaced from the portion 26.

The cup-like member 52 and the cylindrical portion 26 define an annular cavity 54 therebetween; the member 52 and the casing 20 define an annular cavity 56 which communicates with the cavity 54; the cavity 54 communicates with the cavity 30 by way of the passage 32.

As noted there is oil below the member 22 and well fluid above the member 22; the oil and well fluid form an interface at 56. The float 46 is supported at a certain level by the buoyant force of the liquid; the valve arm 48 connected tho the float 46 controls the position of the valve 44, and the flow of oil upwardly through the passageway 34 into the cavities 30 and 54 is controlled by the valve 44. When the level of the well fluid begins to rise, attempting to change the position of the oil-well fluid interface the float 46 rises changing the position of the arm 48 such that the valve 44 rises, permitting an increased flow of oil into the cavities 30 and 54. The net effect is to maintain a substantially constant interface level. The pump 42 continuously operates; when the valve 44 is closed or partially open and there is excess oil flow, the excess flows through the by-pass passage 38 back to the pump inlet.

The oil used in this invention has a specific gravity of less than one, with a specific gravity of about 0.80 to 0.85. It must possess good lubricating properties, have a high dielectric strength, and be substantially immiscible in the well fluid. The invention is not dependent upon a specific oil composition, so long as the oil possesses the required properties.

I claim:

1. Apparatus for maintaining a predetermined level of the oil-well fluid interface in a seal section associated with a submersible electric motor which drives a submersible pump comprising:
   a housing;
   means dividing said housing into a motor compartment and a pump compartment;
   an electric motor in said motor compartment, said motor compartment being filled with oil;
   a pump in said pump compartment, said pump compartment being filled with well fluid;
   a shaft means forming the driving connection between the motor and the pump and passing through the dividing means;
   means defining a chamber in communication with said motor compartment and said pump compartment and having both oil and water with an interface therebetween;
   means in said motor compartment for supplying oil under pressure to said chamber;
   means comprising a valve to regulate the supply of said oil to said chamber;
   sensing means comprising a float to sense the level of said interface and to control said regulating means to thereby sense changes in said interface level and regulate the supply of oil to said chamber in response to said changes in interface level;
   a cup-shaped member connected to said shaft means and defining an outer rotating wall of said chamber and a cylindrical portion of said driving means, and means defining an inner stationary wall of said chamber; and
   a cavity in said cylindrical portion communicating with said chamber, said float being confined in said cavity.

2. Apparatus as recited in claim 1 wherein said float is supported by an arm attached to a pivot, said arm engaging said valve, and wherein an auxiliary pump supplies oil under pressure to said valve.

* * * * *